(12) United States Patent
Altamirano

(10) Patent No.: US 11,225,860 B2
(45) Date of Patent: Jan. 18, 2022

(54) JOB EXPERIENCE CAPTURE

(71) Applicant: Schlumberger Technology Corporation, Sugar Land, TX (US)

(72) Inventor: Arturo E. Altamirano, Stafford, TX (US)

(73) Assignee: Schlumberger Technology Corproation, Sugar Land, TX (US)

(*) Notice: Subject to any disclaimer, the term of this patent is extended or adjusted under 35 U.S.C. 154(b) by 142 days.

(21) Appl. No.: 15/133,852

(22) Filed: Apr. 20, 2016

(65) Prior Publication Data

US 2017/0308805 A1     Oct. 26, 2017

(51) Int. Cl.
| | |
|---|---|
| *E21B 41/00* | (2006.01) |
| *E21B 43/26* | (2006.01) |
| *G05B 15/02* | (2006.01) |
| *E21B 47/00* | (2012.01) |

(52) U.S. Cl.
CPC .............. *E21B 43/26* (2013.01); *E21B 47/00* (2013.01); *G05B 15/02* (2013.01)

(58) Field of Classification Search
CPC ................... E21B 41/0092; G06N 99/005
See application file for complete search history.

(56) References Cited

U.S. PATENT DOCUMENTS

2016/0186531 A1*  6/2016  Harkless ................. E21B 33/13
                                                            702/6

FOREIGN PATENT DOCUMENTS

EP           0595387 A2 *  5/1994  ......... G06F 3/04855

* cited by examiner

*Primary Examiner* — Cathleen R Hutchins
*Assistant Examiner* — Ronald R Runyan
(74) *Attorney, Agent, or Firm* — Michael L. Flynn

(57) ABSTRACT

The present disclosure introduces methods and systems for capturing knowledge and experience of wellsite operators. Sensors at a wellsite generate sensor data during a wellsite operation. Operator data indicative of human actions performed at the wellsite during the wellsite operation are also generated. The sensor and operator data is synchronized to capture job experience and knowledge pertaining to the wellsite operation.

17 Claims, 7 Drawing Sheets

JOB EXPERIENCE CAPTURE

BACKGROUND OF THE DISCLOSURE

In oil and gas operations, such as cementing and fracturing jobs, various wellsite components and equipment are utilized. The success of such wellsite operations may be related to many factors, including quality execution of control, maintenance, and repair of the wellsite equipment.

Quality execution of wellsite operations utilizes insight and knowledge gained by wellsite operators over time and through experience, and thus may not be possessed by new employees. Accordingly, such wellsite operations may be optimized, in part, by training new employees and employing wellsite operators who have gained knowledge through experience. However, such knowledge is not easily recorded, transferred, and taught to others, as knowledge is typically gained through actual job execution and performance. Moreover, circumstances and issues of a particular job and the way such issues were resolved constitute the essence of gaining knowledge through experience. Hence, job knowledge may be lost when, for example, experienced wellsite operators change positions within a company or leave their employment with the company.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus that includes a wellsite system, input devices, and a processing device. The wellsite system includes multiple wellsite components. Each input device is associated with a corresponding one of the wellsite components, and is operable to generate sensor data and operator data. The sensor data is indicative of a parameter associated with a wellsite operation, and the operator data is indicative of a human action performed in association with the wellsite operation. The processing device includes a processor and a memory including computer program code, and is operable to synchronize the sensor and operator data generated by each of the input devices, and to output the synchronized sensor and operator data on an audiovisual output device.

The present disclosure also introduces a method that includes operating a processing device comprising a processor and a memory including computer program code. Operating the processing device causes and/or comprises: recording sensor data comprising information generated by each of multiple sensors at a wellsite during a wellsite operation; recording operator data indicative of a human action performed at the wellsite during the wellsite operation; and synchronizing the sensor and operator data.

The present disclosure also introduces a method that includes time-logging sensor data generated by multiple sensors at a wellsite during a wellsite operation. Each sensor is associated with a corresponding one of multiple wellsite components utilized during the wellsite operation. The sensor data is indicative of a corresponding parameter associated with operation of the corresponding wellsite component during the wellsite operation. The method also includes time-logging operator data generated by multiple input devices at the wellsite. The operator data is indicative of a human action performed at the wellsite during the wellsite operation. The method also includes operating a processing device to synchronize the sensor and operator data. The processing device includes a processor and a memory including computer program code.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
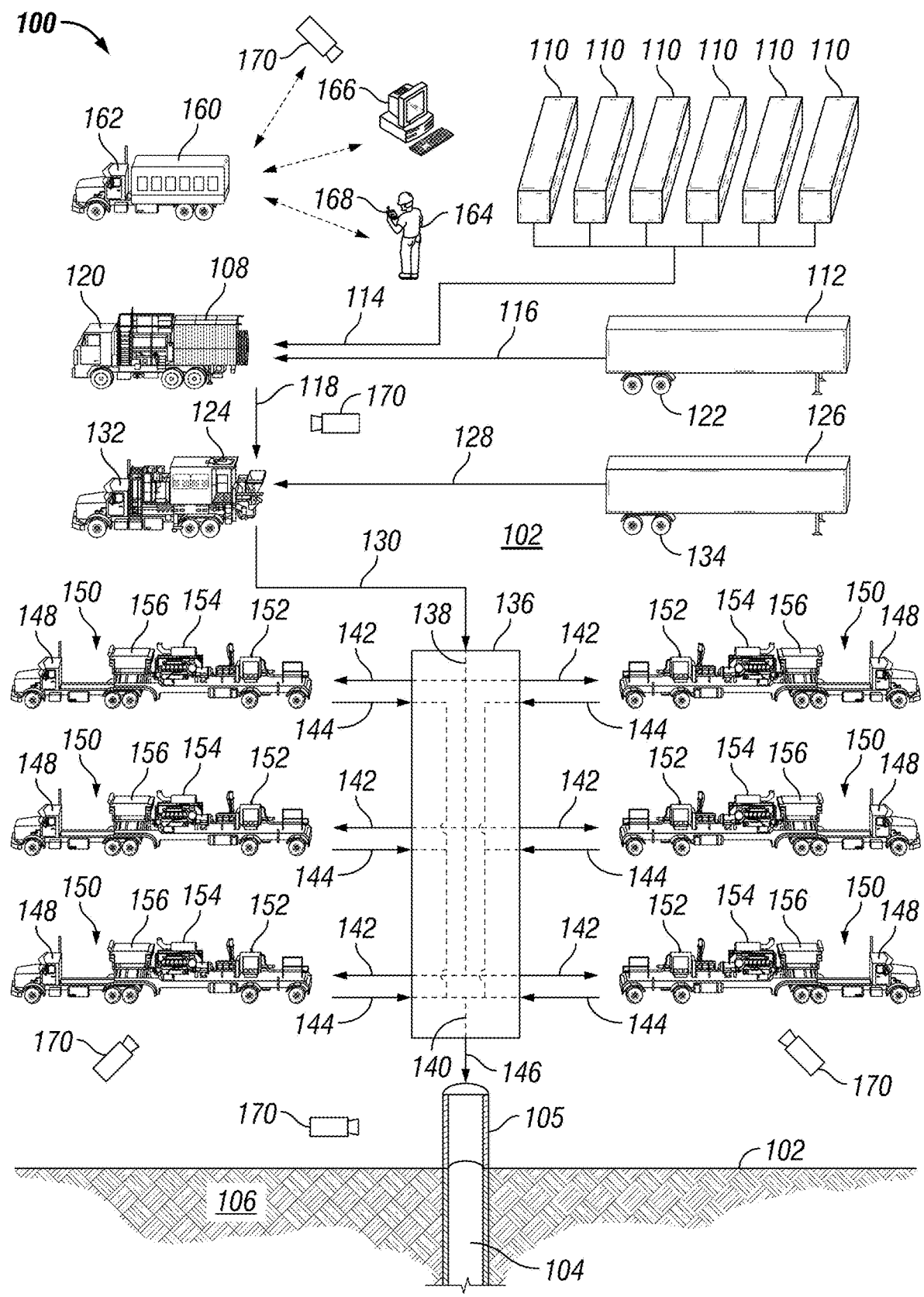
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

The present disclosure describes example systems and methods for capturing knowledge and experience of wellsite operators by recording actual job execution and performance of the wellsite operators along with operational parameters detected during the wellsite operations. The systems and methods may also facilitate synchronized playback or output of the recorded job execution and operational parameters, such as to prepare other wellsite operators for future operations or otherwise transfer the knowledge and experience to the other wellsite operators.

FIG. 1 is a schematic view of at least a portion of an example environment in which a data acquisition and output system (hereinafter referred to as a "data system") according to one or more aspects of the present disclosure may be utilized. The figure shows a wellsite 102, a wellbore 104 extending from the terrain surface of the wellsite 102, a partial sectional view of a subterranean formation 106 penetrated by the wellbore 104, and a wellhead 108, as well as a wellsite system 100 comprising various pieces of equipment or components located at the wellsite 102. The wellsite system 100 may be operable to transfer various materials and additives from corresponding sources to a destination location for blending or mixing and eventual injection into the wellbore 104 during fracturing operations.

The wellsite system 100 may comprise a mixing unit 108 (referred to hereinafter as a "mixer") fluidly connected with one or more tanks 110 and a container 112. The container 112 may contain a first material and the tanks 110 may contain a liquid. The first material may be or comprise a hydratable material or gelling agent, such as guar, polymers, synthetic polymers, galactomannan, polysaccharides, cellulose, and/or clay, among other examples. The liquid may be or comprise an aqueous fluid, such as water or an aqueous solution comprising water, among other examples. The mixer 108 may be operable to receive the first material and the liquid, via two or more conduits or other material transfer means (hereafter simply "conduits") 114, 116, and mix or otherwise combine the first material and the liquid to form a base fluid, which may be or comprise that which is known in the art as a gel. The mixer 108 may then discharge the base fluid via one or more fluid conduits 118.

The wellsite system 100 may further comprise a mixer 124 fluidly connected with the mixer 108 and a container 126. The container 126 may contain a second material that may be substantially different than the first material. For example, the second material may be or comprise a proppant material, such as sand, sand-like particles, silica, quartz, and/or propping agents, among other examples. The mixer 124 may be operable to receive the base fluid from the mixer 108 via one or more fluid conduits 118, and the second material from the container 126 via one or more fluid conduits 128, and mix or otherwise combine the base fluid and the second material to form a mixture. The mixture may be or comprise that which is known in the art as a fracturing fluid. The mixer 124 may then discharge the mixture via one or more fluid conduits 130.

The mixture may be communicated from the mixer 124 to a common manifold 136 via the one or more fluid conduits 130. The common manifold 136 may comprise various valves and diverters, as well as a suction line 138 and a discharge line 140, such as may be collectively operable to direct the flow of the mixture in a selected or predetermined manner. The common manifold 136, which may be known in the art as a missile or a missile trailer, may distribute the mixture to a fleet of pumping units 150. Although the fleet is shown comprising six pumping units 150, the fleet may comprise other quantities of pumping units 150 within the scope of the present disclosure.

Each pumping unit 150 may comprise a pump 152, a prime mover 154, and perhaps a heat exchanger 156. Each pumping unit 150 may receive the mixture from the suction line 138 of the common manifold 136, via one or more fluid conduits 142, and discharge the mixture under pressure to the discharge line 140 of the common manifold 136, via one or more fluid conduits 144. The mixture may then be discharged from the common manifold 136 into the wellbore 104 via one or more fluid conduits 146, the wellhead 105, and perhaps various additional valves, conduits, and/or other hydraulic circuitry fluidly connected between the common manifold 136 and the wellbore 104.

The wellsite system 100 may also comprise a control center 160, which may be operable to provide control to one or more portions of the wellsite system 100. The control center 160 may be further operable to monitor health and functionality of one or more portions of the wellsite system 100. For example, the control center 160 may be operable to monitor and control one or more portions of the mixers 108, 124, the pumping units 150, the common manifold 136, and various other pumps, conveyers, and/or other equipment (not shown) disposed along the conduits 114, 116, 118, 128, 130, such as may be operable to move, mix, separate, or measure the fluids, materials, and/or mixtures described above. Control signals may be communicated between the control center 160 and other wellsite equipment wirelessly and/or via electrical cables (not shown).

One or more of the containers 112, 126, the mixers 108, 124, the pumping units 150, and the control center 160 may each be disposed on corresponding trucks, trailers, and/or other mobile carriers 122, 134, 120, 132, 148, 162, respectively, such as may permit their transportation to the wellsite surface 102. However, one or more of the containers 112, 126, the mixers 108, 124, the pumping units 150, and the control center 160 may each be skidded or otherwise stationary, and/or may be temporarily or permanently installed at the wellsite surface 102.

A field engineer, equipment operator, or field operator 164 (collectively referred to hereinafter as a "wellsite operator") may operate one or more components, portions, or systems of the wellsite equipment and/or perform maintenance or repair on the wellsite equipment. For example, the wellsite operator 164 may assemble the wellsite system 100, operate the wellsite equipment to perform the fracturing operations, check equipment operating parameters, and repair or replace malfunctioning or inoperable wellsite equipment, among other operational, maintenance, and repair tasks, collectively referred to hereinafter as wellsite operations. The wellsite operator 164 may perform wellsite operations by himself or with other wellsite operators. During wellsite operations, the wellsite operator 164 may communicate instructions to the other operators via a human machine interface (HMI) 166 and/or a communication device 168. The wellsite operator 164 may also communicate information to the control center 160 via the HMI 166 or the communication device 168 during and/or after the wellsite operations. The wellsite operator 164 may also control one or more components, portions, or systems of the wellsite system 100 from the control center 160 or via the HMI 166 or the communication device 168.

The wellsite system 100 may further include a plurality of stationary or mobile cameras 170 disposed or utilized at various locations within the wellsite 102. The cameras 170 may be operable to capture photographs and/or videos of various components, portions, or systems of the wellsite system 100 during wellsite operations. The cameras 170 may be further operable to capture photographs and/or videos of the wellsite operators 164 and the actions they perform during or otherwise in association the wellsite operations. For example, the cameras 170 may capture photographs and/or videos of the entire wellsite system 100 and/or specific portions of the wellsite system 100, such as the mixers 108, 124, the pumping units 150, the manifold 136, and/or the wellhead 105, during and after wellsite operations. The cameras 170 may further capture photographs and/or videos of the wellsite operator 164 performing wellsite operations, including while performing repairs to the wellsite equipment during a breakdown. The cameras 170 may be in signal communication with the control center 160, such as may permit the wellsite operator 164 to view various portions or components of the wellsite system 100 on an audiovisual output device (not shown). The cameras 170 may also be in signal communication with the HMI 166 and/or the communication device 169, such as may permit the wellsite operator 164 to view the wellsite system 100 from other locations. The control center 160 or another portion of the wellsite system 100 may include a processing device (not shown), which may be operable to record photograph and/or video signals generated by the cameras 170.

Figure 2:
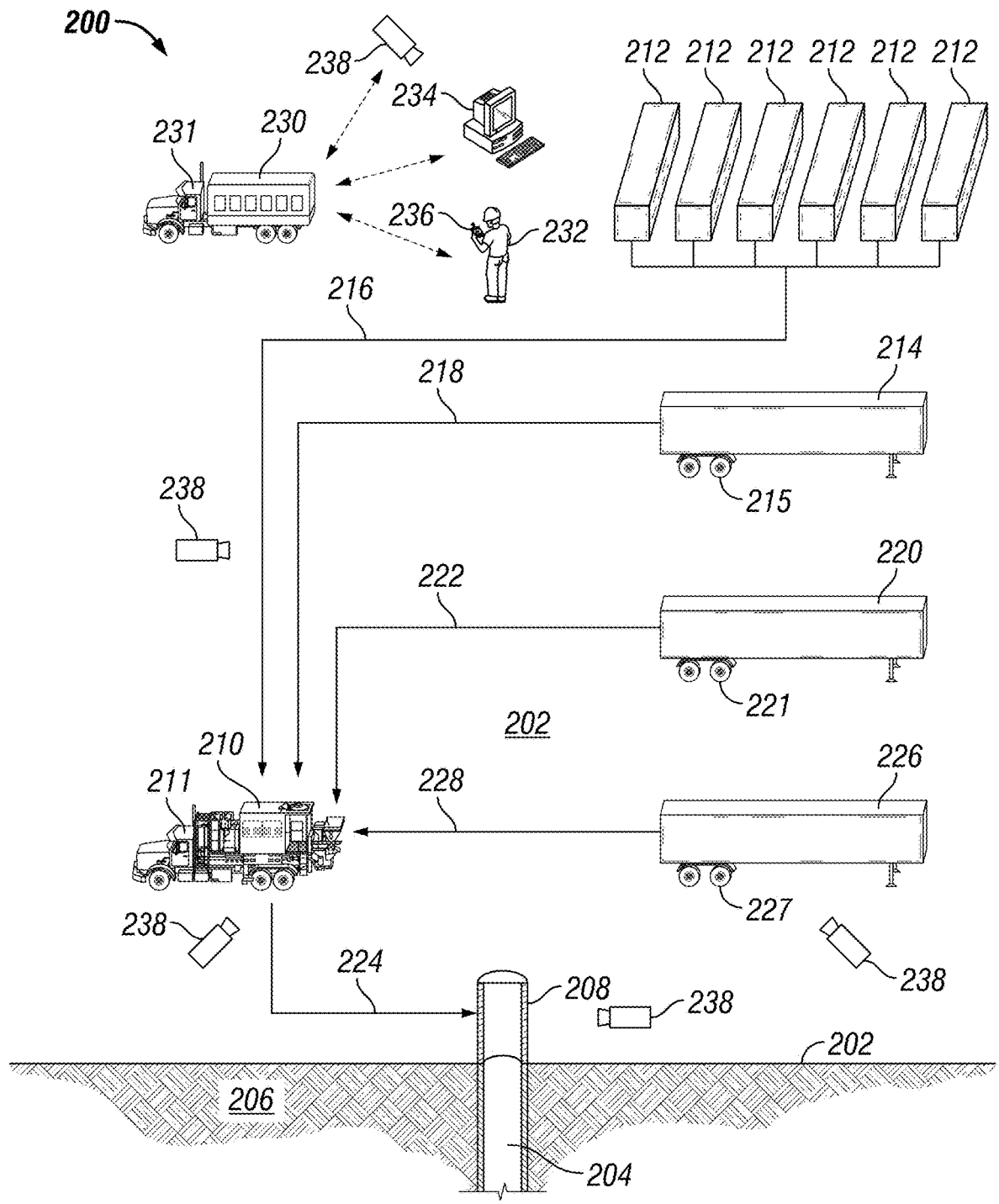
FIG. 2 is a schematic view of at least a portion of an example implementation of apparatus according to one or more aspects of the present disclosure.

FIG. 2 is a schematic view of at least a portion of another example environment in which the data system according to one or more aspects of the present disclosure may be utilized. The figure shows a wellsite 202, a wellbore 204, a partial sectional view of the subterranean formation 206 penetrated by the wellbore 204, and a wellhead 208, as well as a wellsite system 200 comprising various pieces of equipment or components located at the wellsite 202. The wellsite system 200 may be operable to transfer various materials and additives from corresponding sources to a destination location for blending or mixing and eventual injection into the wellbore 204 during cementing operations.

The wellsite system 200 may comprise a mixing and pumping unit 210 (referred to hereinafter as a "mixer") fluidly connected with one or more tanks 212 and a container 214. The tanks 212 may contain that which is known in the art as a base fluid, which may be or comprise fresh water, brine, and/or mud. The container 214 may contain liquid or solid chemicals or additives operable to treat the base fluid. The additives may be or comprise accelerators, retarders, fluid-loss additives, dispersants, extenders, weighting agents, and/or lost circulation additives, among other examples. The mixer 210 may be operable to receive the base fluid and one or more of the additives via fluid conduits 216, 218, and mix or otherwise combine the base fluid and the additives to form that which is known in the art as a mixed fluid.

The wellsite system 200 may further comprise a container 220, which may contain a bulk material that is substantially different than the additives contained in the container 214. For example, the bulk material may be or comprise a cement powder or bulk cement, among other examples. The mixer 210 may be operable to receive the bulk cement from the container 220 via a conduit 222 and mix or otherwise combine the mixed fluid and the bulk cement to form a mixture, which may be or comprise that which is known in the art as a cement slurry. The mixer 210 may then discharge or pump the cement slurry into the wellbore 204 via one or more fluid conduits 224 and the wellhead 208.

The wellsite system 200 may further comprise a batch mixer 226 operable to receive and mix predetermined quantities of the base fluid, additives, and/or bulk cement to form predetermined quantities or batches of the mixed fluid and/or cement slurry. If the batch mixer 226 is utilized to store the mixed fluid, the mixed fluid may be communicated to the mixer 210 via a fluid conduit 228 to be mixed with the bulk cement to form the cement slurry. If the batch mixer 226 is utilized to store the cement slurry, the cement slurry may be communicated to the mixer 210 via the fluid conduit 228 and pumped by the mixer 210 into the wellbore 204 via the fluid conduit 224 and the wellhead 208.

The wellsite system 200 may also comprise a control center 230, which may be operable to provide control to one or more portions of the wellsite system 200 during cementing operations. The control center 230 may be further operable to monitor health and functionality of one or more portions of the wellsite system 200. For example, the control center 230 may be operable to monitor and control one or more portions of the mixer 210 and various other pumps, conveyers, and/or other equipment (not shown) disposed along the conduits 216, 218, 222, 228, such as may be operable to move, mix, separate, or measure the materials, fluids, and/or mixtures described above. Control signals may be communicated between the control center 230 and other wellsite equipment wirelessly and/or via electrical cables (not shown).

One or more of the mixer 210, the containers 214, 220, the batch mixer 226, and/or the control center 230 may each be disposed on corresponding trucks, trailers, and/or other mobile carriers 211, 215, 221, 227, 231 respectively, such as may permit their transportation to the wellsite surface 202. However, one or more of the mixer 210, the containers 214, 220, the batch mixer 226, and/or the control center 230 may be skidded or otherwise stationary, and/or may be temporarily or permanently installed at the wellsite surface 202.

A wellsite operator 232 may operate one or more components, portions, or systems of the wellsite equipment and/or perform maintenance or repair on the wellsite equipment. For example, the wellsite operator 232 may assemble the wellsite system 200, operate the wellsite equipment to perform the cementing operations, check equipment operating parameters, and repair or replace malfunctioning or inoperable wellsite equipment, among other operational, maintenance, and repair tasks, also collectively referred to herein as wellsite operations. The wellsite operator 232 may perform wellsite operations by himself or with other wellsite operators. During wellsite operations, the wellsite operator 232 may communicate instructions to the other wellsite operators via an HMI 234 and/or a communication device 236. The wellsite operator 232 may also communicate information to the control center 230 via the HMI 234 or the communication device 236 during and/or after the wellsite operations. The wellsite operator 232 may also control one or more components, portions, or systems of the wellsite equipment or portions of the wellsite system 200 from the control center 230 or via the HMI 234 or the communication device 236.

The wellsite system 200 may further include a plurality of stationary or mobile cameras 238 disposed or utilized at various locations within the wellsite 202. The cameras 238 may be operable to capture photographs and/or videos of various components, portions, or systems of the wellsite system 200 during wellsite operations. The cameras 238 may be further operable to capture photographs and/or videos of the wellsite operators 232 and the actions they perform during or otherwise in association with the wellsite operations. For example, the cameras 238 may capture photographs and/or videos of the entire wellsite system 200 and/or specific portions of the wellsite system 200, such as the mixer 210, the containers 214, 220, 226, and/or the wellhead 208, during and after wellsite operations. The cameras 238 may further capture photographs and/or videos of the wellsite operator 232 performing wellsite operations, including while performing repairs to the wellsite equipment during a breakdown. The cameras 232 may be in signal communication with the control center 230, such as may permit the wellsite operator 232 to view various portions or components of the wellsite system 200 on an audiovisual output device (not shown). The cameras 238 may also be in signal communication with the HMI 234 and/or the communication device 236, such as may permit the wellsite operator 232 to view the wellsite system 200 from other locations. The control center 230 or another portion of the wellsite system 200 may include a processing device (not shown), which may be operable to record photograph and/or video signals generated by the cameras 232.

Although FIGS. 1 and 2 show the wellsite systems 100, 200 implemented on different wellsites 102, 202, it is to be understood that the wellsite systems 100, 200 may be implemented on the same wellsite, but at different times or stages of wellsite operations. For example, the wellsite system 100 may be utilized at a wellsite to perform the fracturing operations after the wellsite system 200 is utilized at the wellsite to perform the cementing operations and/or vice versa.

Furthermore, although FIGS. 1 and 2 show the wellsite systems 100, 200 operable for mixing and/or producing fluids and mixtures that may be pressurized and injected into the wellbore during fracturing and cementing operations, it is to be understood that the data system within the scope of the present disclosure may be implemented or otherwise utilized with other wellsite systems. For example, the data system within the scope of present disclosure may be utilized with and operable to capture knowledge and experience of wellsite operators during other wellsite operations, such as sampling, completion, production, acidizing, chemical injecting, workover, and water jet cutting operations, among other examples.

Accordingly, except when referring to a specific fluid, the various fluids or mixtures communicated between the various components of the wellsite systems 100, 200 described above may be referred to hereinafter simply as "a fluid." Also, except when referring to a specific component, portion, or system of the wellsite systems 100, 200, the various components, including the tanks 110, 212, the containers 112, 126, 214, 220, 226, the mixers 108, 124, 210, pumping units 150, the manifold 136, and the wellheads 105, 208 described above, may be collectively referred to hereinafter as "wellsite components."

Figure 3:
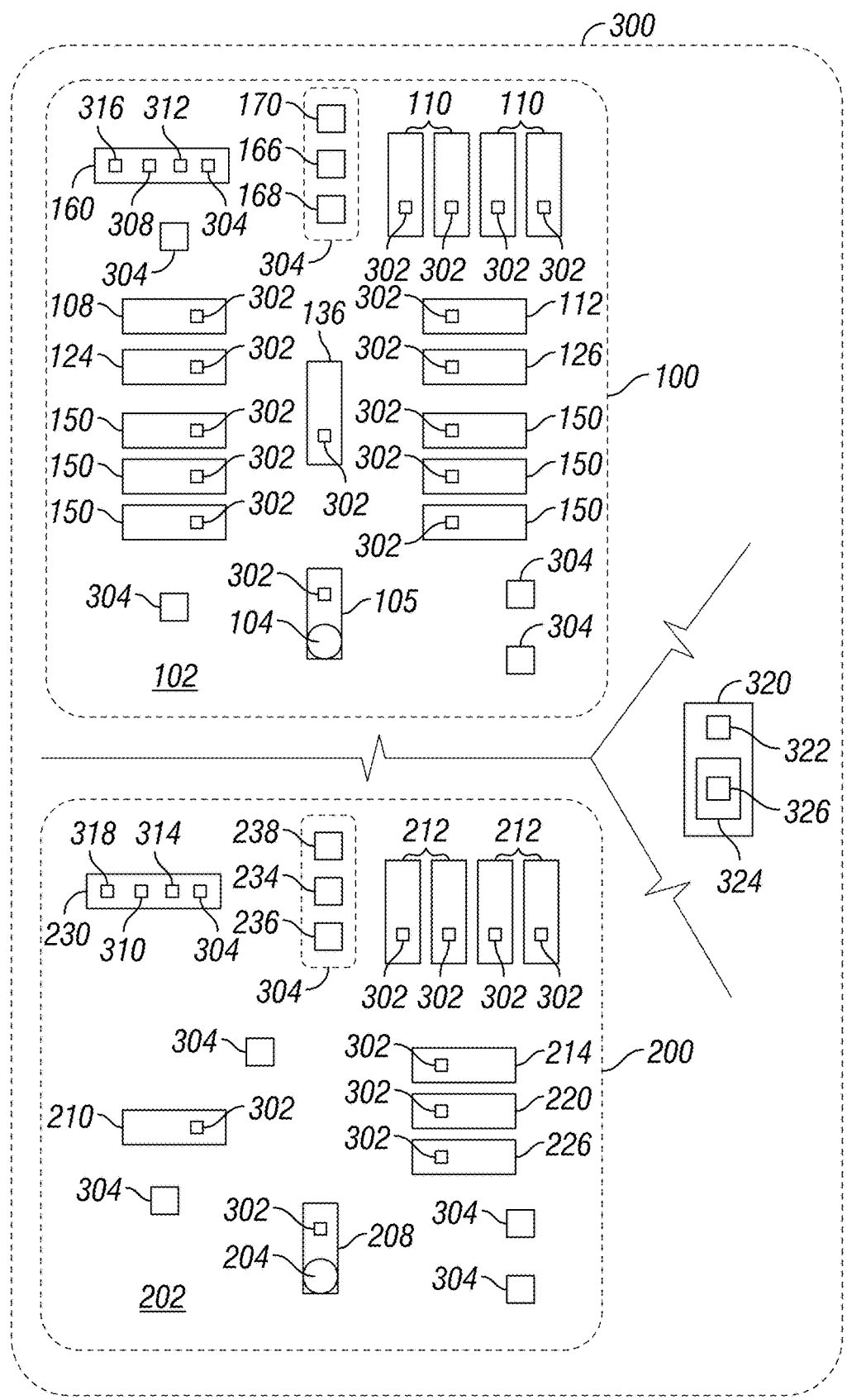
FIG. 3 is a schematic view of at least a portion of an example implementation of apparatus according to one or more aspects of the present disclosure.

FIG. 3 is a schematic view of at least a portion of an example implementation of a data system 300 operable in conjunction with the wellsite systems 100, 200 located at the wellsites 102, 202, respectively, according to one or more aspects of the present disclosure. The data system 300 may be operable for recording various sensor and operator data generated at the wellsites 102, 202 and playing back or outputting the sensor and operator data in a synchronized manner or form. The wellsites 102, 202 may be located at substantial distances from each other. Although FIG. 3 shows the data system 300 operable in conjunction with both wellsite systems 100, 200, it is to be understood that the data system 300 may be operable in conjunction with a single wellsite system, including the wellsite system 100, the wellsite system 200, or another wellsite system implemented to perform wellsite operations other than as described above.

The sensor data within the scope of the present disclosure may comprise information or signals indicative of physical properties or parameters detected at the wellsites 102, 202 by various input devices 302. Each input device 302 may include one or more sensors disposed in association with a corresponding wellsite component and operable to generate information or signals indicative of one or more physical properties or parameters associated with the wellsite operation. Such parameters may include fluid pressure, fluid force, fluid flow rate, fluid density, fluid level, wellsite component position or setting, valve position or setting, tool position or depth, fluid speed, pump rotational position or speed, actuator rotational position or speed, fluid temperature, and electric power draw, among other examples also within the scope of the present disclosure. Accordingly, the input devices 302 may each be or comprise one or more pressure sensors, load cells, vibration sensors, flow sensors, densitometers, spectrometers, fluid or material level sensors, actuator position feedback sensors, valve position feedback sensors, rotational position and speed sensors, temperature sensors, voltmeters, and ammeters, among other examples also within the scope of the present disclosure.

With respect to the wellsite systems 100, 200, the input devices 302 associated with the tanks 110, 212, the containers 112, 126, 214, 220, and the batch mixer 226 may be or comprise, for example, fluid or material level sensors and/or liquid and dry material flow meters. The input devices 302 associated with the mixers 108, 124, 210 may be or comprise, for example, mixer rotational speed sensors (e.g., encoders), liquid and dry material flow sensors (e.g., load cells or flow meters), mixture or fluid density sensors (e.g., densitometers), and/or vibration or shock sensors (e.g., accelerometers). The input devices 302 associated with the pumping units 150 may be or comprise fluid pressure sensors, temperature sensors, actuator or pump rotational speed sensors, flow meters, and/or vibration or shock sensors. The input devices 302 associated with the manifold may be or comprise pressure sensors, flow meters, and/or fluid valve position sensors. The input devices 302 associated with the wellheads 105, 208 may be or comprise pressure sensors and/or fluid valve position sensors. However, these are merely examples, an the input devices 302 may include other types of sensors also within the scope of the present disclosure.

Operator data within the scope of the present disclosure may comprise information or signals indicative of human actions performed by one or more wellsite operators, such as the wellsite operators 164, 232, during or otherwise in association with wellsite operations. The operator data may be detected at the wellsites 102, 202 by input devices 304. Each input device 304 may include one or more sensors and/or other devices disposed in association with a corresponding wellsite component or other locations at the wellsites 102, 202, and are operable to generate information or signals indicative of the human actions performed by the wellsite operators 164, 232 in association with the wellsite operations. Human actions may include, for example, operating or controlling wellsite components, performing maintenance and/or repair on wellsite components, and replacing wellsite components. Human actions may be in the form of verbal or voice instructions or utterances, physical actions, and/or commands input to certain input devices 304 by the wellsite operators 164, 232. The input devices 304 may be stationary or mobile, so as to be disposed or utilized at specific or various locations at the wellsites 102, 202, including outer perimeters of the wellsites 102, 202, in association with predetermined components, portions, or systems of the wellsite systems 100, 200, and/or areas frequented by the wellsite operators 164, 232. As described below, the wellsite operators 164, 232 may also carry some input devices 304 as they move about the wellsites 102, 202.

The input devices 304 may be, comprise, or be implemented by a mobile phone, a smart phone, a tablet computer, a laptop computer, and/or other electronic devices having a keyboard, a mouse, a touchscreen, a touchpad, and/or a trackball, among other example input means. The input devices 304 may also be, comprise, or be implemented by the HMIs 166, 234 and the communication devices 168, 236, which may be operable to receive the command inputs from the wellsite operators 164, 232. Such input devices 304 may be operable to receive command inputs entered by the wellsite operators 164, 232 and generate the operator data in the form of an electronic command signal, which may be communicated to the control centers 160, 230 or another location to be executed or otherwise implemented. The input devices 304 may also be utilized to send and receive operator data in the form of written communications, such as texts and emails, related to the wellsite operations. Such operator data may be saved as an electronic text file on each respective device and/or communicated to the control centers 160, 230 or another location.

The input devices 304 may further be, comprise, or be implemented as the communication devices 168, 236, microphones (not shown), and/or other audio receiving devices. Such input devices 304 may be operable to receive voice instructions or commands spoken by the wellsite operators 164, 232 and generate the operator data in the form of an audio signal, which may be communicated to other wellsite operators 164, 232 at another location, who may perform or otherwise implement the voice instructions.

The input devices 304 may also be, comprise, or be implemented as the cameras 170, 238. Such input devices 304 may be operable to capture photographs and/or videos of various portions of the wellsites 102, 202 during wellsite operations, and/or actions performed by the wellsite operators 164, 232 during the wellsite operations. For example, the cameras may capture the wellsite operators 164, 232 performing physical actions or tasks performed to conduct the wellsite operations. The cameras 170, 238 may generate the operator data in the form of a photograph, video, sound recording, or other audio, visual, or audiovisual signal, which may be communicated to the control centers 160, 230 or other portions of the wellsite systems 100, 200 to be recorded and/or reviewed by the wellsite operators 164, 232.

Another form of operator data may include electronic text files created by the wellsite operators 164, 232 by utilizing an input device 304, such as may be associated with the control center 160, the HMIs 166, 234, and/or the communication devices 168, 236. The text files may comprise written descriptions of operational events at the wellsites 102, 202 and/or actions performed by the wellsite operators 164, 232 at the wellsites 102, 202 during the wellsite operations. For example, an electronic text file may include a detailed description of a wellsite component problem or failure and/or a detailed description of steps or procedures that were performed by the wellsite operators 164, 232 to solve the problem and/or repair the wellsite component.

The sensor and operator data generated by the input devices 302, 304 may be transmitted to and recorded by a computer or another processing device 308, 310 located at each wellsite 102, 202 and in communication with the input devices 302, 304. Each processing device 308, 310 may be implemented as part of or otherwise in association with a corresponding control center 160, 230 or another component of the wellsite system 100, 200. Accordingly, the operator data may comprise audio, visual, audiovisual, and/or text files comprising command inputs and/or written descriptions of the operational events. The sensor data generated by the input devices 302 may form databases or other electronic files operable to store the sensor data.

The sensor and operator data may be communicated between input devices 302, 304 and the processing devices 308, 310 wirelessly and/or via electrical cables (not shown). For example, the input devices 302, 304, may be operable to communicate with the processing devices 308, 310 via a wireless local network (WLN). Accordingly, each input device 302, 304 may comprise or be associated with a transceiver (not shown) located within a communication range from a transceiver 312, 314 associated with a corresponding processing device 308, 310. For example, each transceiver may comprise a radio communication device. The input devices 302, 304 and the processing devices 308, 310 may be also or instead be operable to communicate with each other via local area network (LAN) transceivers (not shown) operable for wired communication. Each LAN transceiver may be connected via appropriate data cables (not shown) to collectively form a LAN. However, network types other than WLN and LAN networks may also or instead be utilized.

The sensor and operator data may also be transmitted or otherwise communicated from each processing device 308, 310 to an offsite location via a corresponding transceiver 312, 314. For example, the recorded sensor and operator data may be transmitted via the transceivers 312, 314 to an offsite data center 320, which may be located at a substantial distance from the wellsites 102, 202. The data center 320 may be operable to receive the sensor and operator data via a transceiver 322. The transceivers 312, 314, 322 may be or comprise wireless wide area network (WWAN) transceivers operable to transmit and/or receive information via a WWAN, such as a mobile telecommunication cellular network or a satellite communication network. The transceivers 312, 314, 322 may comprise, for example, a very small aperture terminal (VSAT), a cellular network transceiver, a satellite transceiver, and/or other communication devices operable to communicate via the WWAN. However, other network types are also within the scope of the present disclosure. The sensor and operator data received by the transceiver 322 may be processed by a processing device 326 and recorded on a server 324 for later retrieval.

The sensor and operator data received and/or processed by the processing devices 308, 310 may be output in an audio, visual, or audiovisual form via one or more output devices 316, 318. Each output device 316, 318 may be implemented as part of or in association with a corresponding control center 160, 230 or another component of the wellsite systems 100, 200. The output devices 316, 318 may be, comprise, or be implemented by visual output devices, such as display monitors (e.g., a liquid crystal displays (LCD) or cathode ray tube displays (CRT)) printers, and/or audio output devices, such as audio speakers. Other output devices may be, comprise, or be implemented by the HMIs 166, 234 and/or the communication devices 168, 236, which may thus also be operable to display the sensor and operator data. Accordingly, the HMIs 166, 234 and the communication devices 168, 236, may be or comprise both the input devices 304 and the output devices 316, 318.

Figure 4:
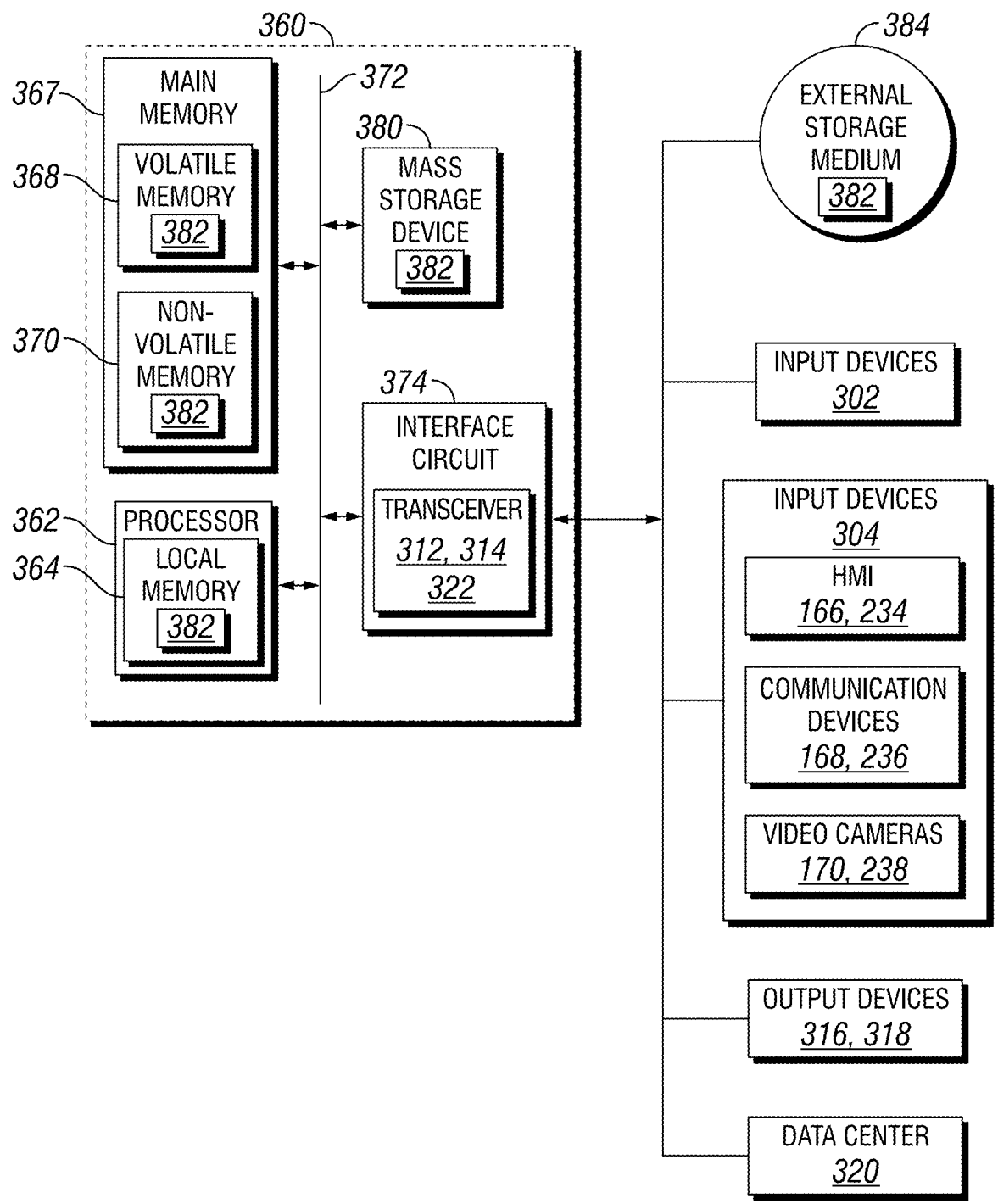
FIG. 4 is a schematic view of at least a portion of an example implementation of apparatus according to one or more aspects of the present disclosure.

In addition to processing and recording the sensor and operator data, the processing devices 308, 310, 326 may be operable to execute machine-readable instructions to implement at least a portion of one or more methods, processes, and/or systems described herein. FIG. 4 is a schematic view of at least a portion of an example implementation of the processing devices 308, 310, 326 shown in FIG. 3 according to one or more aspects of the present disclosure, and designated in FIG. 4 by reference numeral 360. One or more of the HMIs 166, 234, the communication devices 168, 236, the input devices 304, and the output devices 316, 318 shown in FIGS. 1-3 may also be implemented similarly to the processing device 360 shown in FIG. 4, although perhaps as some subset of the components depicted in FIG. 4. The following description refers to FIGS. 3 and 4, collectively.

The processing device 360 may be or comprise, for example, one or more general- or special-processors, computing devices, servers, personal computers, laptop computers, tablet devices, personal digital assistant (PDA) devices, smartphones, internet appliances, and/or other types of computing devices. The processing device 360 may comprise a processor 362, such as a general-purpose programmable processor. The processor 362 may comprise a local memory 364, and may execute coded instructions 382 present in the local memory 364 and/or another memory device. The coded instructions 382 may include machine-readable instructions or programs to implement the methods and/or apparatus described herein. The processor 362 may be, comprise, or be implemented by one or more processors of various types suitable to the local application environment, and may include one or more general- or special-purpose computers, microprocessors, digital signal processors (DSPs), field-programmable gate arrays (FPGAs), application-specific integrated circuits (ASICs), and processors based on a multi-core processor architecture, among other examples.

The processor 362 may be in communication with a main memory 367, such as via a bus 372 and/or other communication means. The main memory 367 may comprise a volatile memory 368 and/or a non-volatile memory 370. The volatile memory 368 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 370 may be, comprise, or be implemented by read-only memory, flash memory, and/or other types of memory devices. One or more memory controllers (not shown) may control access to the volatile memory 368 and/or non-volatile memory 370. The processing device 360 may be operable to store or record the sensor and operator data generated by the input devices 302, 304 on the main memory 367.

The processing device 360 may also comprise an interface circuit 374 to facilitate communications between the processing device 360 and other electronic devices, such as the input devices 302, 304, the output devices 316, 318, and the data center 320. The interface circuit 374 may be, comprise, or be implemented by various types of standard interfaces, such as an Ethernet interface, a universal serial bus (USB) interface, and/or a third generation input/output (3GIO) interface, among other examples. The interface circuit 374 may comprise a graphics driver card. The interface circuit 374 may also comprise or be in communication with a corresponding transceiver 312, 314, 322 or another communication device, such as a modem or network interface card, to facilitate exchange of data with other portions of the wellsite system 100, 200, the data center 320, and/or other external computing devices via a network (e.g., Ethernet connection, digital subscriber line (DSL), telephone line, coaxial cable, cellular telephone system, satellite, etc.).

One or more of the input devices 302, 304 may be connected to the interface circuit 374. As described above, the input devices 302, 304 permit the sensor and operator data detected at the wellsites 102, 202 to be transmitted to and recorded by the processing device 360. The input devices 304 may also permit the wellsite operators 164, 232 to enter data and/or commands to the processor 362. One or more output devices 316, 318 may also be connected to the interface circuit 374, such as may facilitate the output of the sensor and operator data.

The processing device 360 may also comprise one or more mass storage devices 380 for storing machine-readable instructions and data. Examples of such mass storage devices 380 include hard disk drives, compact disk (CD) drives, digital versatile disk (DVD) drives, and flash memory banks, among other examples. The coded instructions 382 may be stored in the mass storage device 380, the volatile memory 368, the non-volatile memory 370, the local memory 364, and/or on a removable storage medium 384, such as a CD or DVD. Thus, the processing device 360 may be implemented in accordance with hardware (embodied in one or more chips including an integrated circuit, such as an ASIC), or may be implemented as software or firmware for execution by one or more processors, such as the processor 362. In the case of firmware or software, the implementation may be provided as a computer program product including a computer-readable medium or storage structure embodying computer program code (i.e., software or firmware) thereon for execution by the processor 362.

The coded instructions 382 may include program instructions or computer program code that, when executed by the processor 362, cause the processing device 360 to perform methods and actions as described herein. For example, the coded instructions 382, when executed, may cause the processing device 360 to receive, process, and/or record the sensor and operator data received from the input devices 302, 304.

Figure 5:
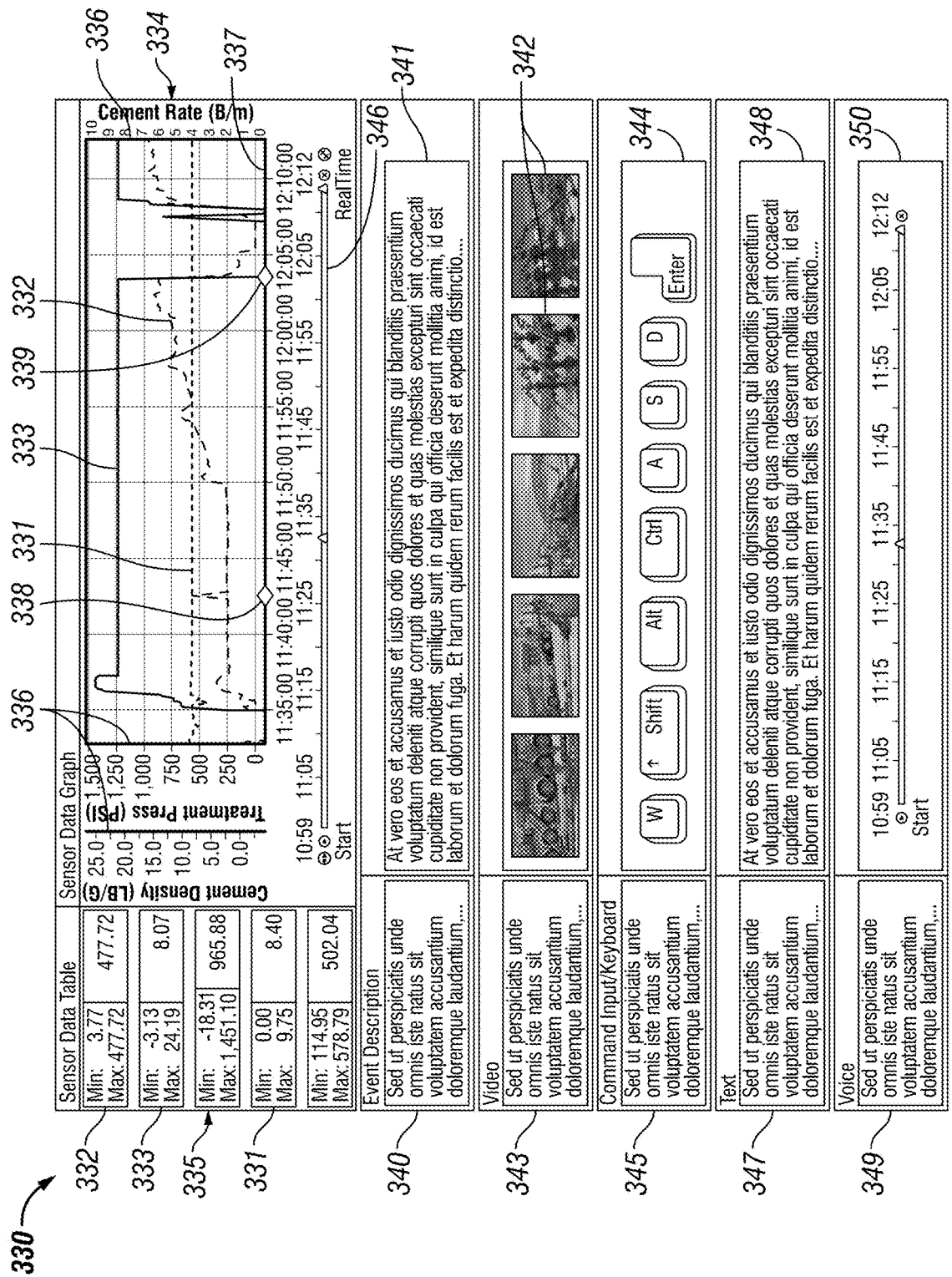
FIG. 5 is a schematic view of at least a portion of an example implementation of apparatus according to one or more aspects of the present disclosure.

The processing device 360 may also be caused to output the sensor and operator data in real-time, or to output the recorded sensor and operator data at a later time, via the output devices 316, 318. FIG. 5 is an example display or user interface screen 330 displaying the sensor and operator data via the output devices 316, 318 according to one or more aspects of the present disclosure.

As shown, the processing device 360 may cause one or more sensor data channels or streams to be displayed in a numerical and/or graph form. The processing device 360 may also cause the sensor and operator data streams generated by at least two of the input devices 302, 304 to be displayed simultaneously on a single output device 316, 318. For example, FIG. 5 shows three sensor data streams, a cement density 331, a treatment pressure 332, and a cement flow rate 333, displayed on a graph 334, while table 335 displays five data streams, including the cement density 331, the treatment pressure 332, and the cement flow rate 333. On the graph 334, the value of each sensor data stream 331, 332, 333 is displayed along vertical axes 336 and a corresponding time associated with the value of each sensor data stream 331, 332, 333 is displayed along a horizontal axis 337, while the table 335 displays the value of each data stream in the numerical form. Although three sensor data streams are displayed on the graph 334 and five sensor data streams are displayed on the table 335, a different number of sensor data streams may be shown on the graph 334 and table 335. For example, the graph 334 may show one, two, four or more sensor data streams, while the table 335 may show less than or more than five sensor data streams. Furthermore, instead of or in addition to the cement density 331, the treatment pressure 332, and the cement flow rate 333, the graph 334 and the table 335 may be caused to display other sensor data streams, such as fluid level, fluid volume, fluid speed, fluid temperature, fluid valve position or setting, downhole tool position or depth, pump rotational position or speed, and electric power draw, among other examples within the scope of the present disclosure. The processing device 360 may also facilitate a zoom function to control the manner in which the sensor and operator data is displayed on the user interface screen 330. For example, the zoom function may permit the wellsite operators 164, 232 to zoom in or magnify certain portions of the user interface screen 330, such as the graph 334, which may not be clearly visible.

The coded instructions 382, when executed, may also cause the processing device 360 to synchronize the sensor and operator data, such that the sensor and operator data streams may be output in a synchronized manner. Accordingly, as shown in FIG. 5, a single time line associated with the three sensor data streams 331, 332, 333 may be shown along the horizontal axis 337 of the graph 334.

The processing device 360 may synchronize the sensor and operator data streams, for example, by compiling or integrating multiple sensor and operator data streams received from individual input devices 302, 304 into one or more electronic files or databases containing several or each of the sensor and operator data streams in a synchronized manner or form. The processing device 360 may synchronize the sensor and operator data based on a time stamp embedded within or applied to each sensor and operator data stream. The time stamp may be embedded into each sensor and operator data stream by a local processing device (not shown) associated with the input devices 302, 304 generating the sensor and operator data stream.

For example, local processing devices associated with the mixers 108, 124, 210 may receive sensor data streams from corresponding input devices 302, such as pressure sensors, temperature sensors, and rotational speed sensors, and embed each sensor data stream with a time stamp as each sensor data stream is being transmitted to the processing device 360. Similarly, a local processing device (not shown) associated with each camera 170, 238 may embed the generated sensor data stream (i.e., video signal) with a time stamp as the sensor data stream is being transmitted to the processing device 360. Accordingly, the processing device 360 may synchronize the received sensor and operator data based on the embedded time stamps and compile the sensor and operator data into a single data file or database. Instead or in addition to the time stamps being embedded by the local processing devices, the processing device 360 may embed or integrate a time stamp within each of the multiple sensor and operator data streams as each data stream is being received by processing device 360.

A time server (not shown) may be located within the control centers 160, 230 or another portion of the wellsite system 100, 200 and in communication with the processing device 360 and the local processing devices to facilitate a uniform time stamp application. The time server may be operable to generate a time signal and communicate such time signal to the processing device 360 and the local processing devices. The time signal may supply each of the processing device 360 and the local processing devices with a uniform or synchronized time and, thus, permit the processing device 360 and the local processing devices to embed each sensor and operator data stream with a uniform or synchronized time stamp.

Also, instead of compiling one or more electronic files containing multiple synchronized sensor and operator data streams, the processing device 360 may be operable to store individual sensor and operator data streams and synchronize the sensor and operator data streams during playback, such as may permit a synchronized output of the multiple sensor and operator data streams.

The coded instructions 382, when executed, may also cause the processing device 360 to simultaneously output the synchronized sensor and operator data on an audiovisual output device in video, audio, and/or text forms. As further shown in FIG. 5, the operator data streams generated by the multiple cameras 170, 238 may be displayed within corresponding video frames 342. A general identification of the wellsite operation and/or location of the cameras 170, 238 may be entered by the wellsite operators 164, 232 and displayed in a video/text frame 343.

The operator data comprising input commands entered by the wellsite operators 164, 232 via a keyboard or other input devices may be visually displayed in a command input/ keyboard frame 344. A general identification of the wellsite operation and/or description of the associated input command may be entered by the wellsite operators 164, 232 and displayed in a command input/keyboard text frame 345.

The operator data comprising written communications, such as texts or emails, sent between the wellsite operators 164, 232 via the HMIs 166, 234, the communication devices 168, 236, and/or other electronic communication means, may be displayed in a text frame 348. A general description or subject matter of the written communication may be entered by the wellsite operators 164, 232 and displayed in another text frame 347.

The operator data comprising voice communications exchanged between the wellsite operators 164, 232 via the HMIs 166, 234, the communication devices 168, 236, and/or other electronic communication means may be output via audio speakers (not shown) and controller by one or more audio player interfaces 350. Identification, source, and/or general content of each audio file may be entered by the wellsite operators 164, 232 and displayed in a voice text frame 349.

The coded instructions 382, when executed, may also cause the processing device 360 to facilitate or permit the wellsite operators 164, 232 to set, embed, or create links, pointers, or other markers within or in association with one or more of the sensor and operator data streams or otherwise within the compiled sensor and operator data file and in association with an operational issue or event at the wellsite 102, 202. Each marker may be linked or associated with text containing a written description of the operational event at the wellsite 102, 202. For example, the written description may comprise a description of the actual operational issue or event, the cause of the operational event, and/or steps or procedures that were performed by the wellsite operators 164, 232 to solve problems associated with the operational event and/or repair damage resulting from or caused by the operational event. A general identification of the operational event associated with each marker 338, 339 may be entered into the controller 360 by the wellsite operators 164, 232 via one or more input devices 304 and displayed in an event description text frame 340. A more detailed description of the operational event associated with each marker 338, 339 may be entered into the controller 360 by the wellsite operators 164, 232 via one or more input devices 304 and displayed in another event description text frame 341. The detailed description may include comments, insights, and evaluations relating to the operational event, causes of the operational event, problems or equipment failures caused by the operational event, and steps or procedures that were performed by the wellsite operators 164, 232 to solve the problems and repair the equipment failures.

For example, as shown in FIG. 5, the marker 338 may be created in association with a sudden treatment pressure spike along the treatment pressure curve 332. The marker 339 may also be created in association with a sudden drop in treatment pressure and cement flow rate along the treatment pressure curve 332 and the cement flow rate curve 333. A general identification of the wellsite operation and/or the failure associated with the pressure and flow fluctuations may be entered by the wellsite operator 164, 232 and displayed in the text frame 340. A more detailed description associated with the pressure and flow fluctuations, such as describing the cause of the pressure and flow rate fluctuations and/or steps or procedures that were performed by the wellsite operators 164, 232 to repair the wellsite equipment causing the pressure and flow fluctuations, may be entered by the wellsite operators 164, 232 and displayed in the event description text frame 341.

The text contained in the general identification and/or the detailed description associated with each marker 338, 339 may contain descriptive terms, phrases, and/or key words associated with the described operational events or issues. The key words may identify wellsite location, type of operation being performed, phase of the operation, which piece of wellsite equipment failed, why the piece of equipment failed, how the piece of equipment was repaired, and perhaps comments relating to prevention of future failures. The key words may include descriptive terms such as, for example, "high pressure phase", "high pressure coupling seal", "piston seal", "erosion", "vibration", etc. The processing device 360 may facilitate or permit a word search to be conducted on the text, including the key words, contained in the general identification and/or the detailed description associated with each marker 338, 339, such as may assist the wellsite operators 164, 232 to find instances or portions of the sensor and operator data that are relevant to a particular subject or inquiry. The search results, namely the compiled sensor and operator data files containing the search term, may be replayed, for example, to teach the wellsite operators 164, 232 how to prevent a similar operational issue or event from taking place in the future or how to solve problems associated with a current operational event by reviewing similar recorded operational events.

The markers and the associated written description may be created in real-time as the sensor and operator data is being received by the processing device 360 during the wellsite operations, or the markers may be created and/or edited at a later time after the wellsite operations are completed and the sensor and operator data was recorded and synchronized. For example, the markers may be created during the wellsite operation and embedded within the sensor and operator data by the wellsite operators 164, 232 as the operational events are taking place. The markers and the associated written description may also be created or edited after the job is completed, such as at the end of the day and/or as part of a quality assurance process, wherein the wellsite operators 164, 232 or wellsite supervisors may review the job performed. Such job review may include entering descriptions, comments, evaluations, insight, and other information not captured by the input devices 302, which may relate to resolution of the issues encountered during the wellsite operations.

The coded instructions 382, when executed, may also cause the processing device 360 to facilitate or permit the wellsite operators 164, 232 to select a portion of the synchronized sensor and operator data and output the selected portion of the synchronized sensor and operator data on the audiovisual output device. For example, the sensor and operator data, including the written description, associated with each marker 338, 339 may be selected and played back or displayed by selecting the corresponding marker 338, 339. By selecting (e.g., clicking on) an intended marker 338, 339, the video, audio, and text data streams recorded during the operational event associated with the marker 338, 339, including the associated sensor data and the written description created during or after the operational event, may be played back or displayed on the user interface screen 330 in the synchronized manner.

A scroll bar 346 may also be utilized to select a predetermined instance or portion of the synchronized sensor and operator data to be displayed on the audiovisual output device. The scroll bar 346 may be displayed along the graph 334 or another location on the user interface screen 330. The scroll bar 346 may permit the wellsite operators 164, 232 to fast-forward and rewind through the synchronized sensor and operator data streams and/or select an intended portion or instance of the synchronized sensor and operator data to be played back at normal speed. The scroll bar 346 may be utilized to simultaneously control synchronized playback of several or each of the sensor and operator data streams shown on the user interface screen 330. For example, moving the scroll bar 346 may fast-forward or rewind through the synchronized sensor and operator data streams shown in each of the graph 334, the table 335, and the text and video frames 342, 343, 344, 345, 347, 348, 349 until the intended portion or instance of the synchronized sensor and operator data streams are displayed. Moving the scroll bar 346 may also fast-forward or rewind through the various markers 338, 339 shown on the user interface screen 330 and the written descriptions associated with each marker 338, 339 and displayed in the text boxes 340, 341. Moving the scroll bar 346 may also fast-forward or rewind playback of the one or more audio streams controlled via the audio player interfaces 350 and played back via one or more audio output devices 316, 318.

The coded instructions 382, when executed, may also cause the processing device 360 to transmit the synchronized sensor and operator data files or databases via a corresponding transceiver 312, 314 to the data center 320 to be recorded on the server 324 for archival and later retrieval. For example, once a particular job is finished, a synchronized sensor and operator data file may be uploaded to a central database on the server 324, such that it may be accessed and/or reviewed by other users. The coded instructions 382 running on the server 324 or another device in communication with the server 324, such as the communication device 168, 236 or the HMI 166, 234, may process the sensor and operator data within the synchronized data file and give it added value. Such process may comprise an office review of each completed job saved on the server 324 via the user interface screen 330. The review may comprise a fast playback of the synchronized sensor and operator data from the completed job, such that a field supervisor or person responsible for job execution may edit existing markers or create additional markers and associated written descriptions containing keywords to identify portions of the completed job where unusual circumstances were encountered and resolved. Additional job details may be entered to describe the resolution of the issues and record substantial insights relating to the job. The keywords and comments may also serve as criteria for search engines that may locate the saved synchronized job files containing the keywords. The field supervisor or other personnel may also point out other issues or circumstances that the sensor data recorded during the wellsite operations did not capture. This review may take between about fifteen minutes and about one hour and may also constitute a quality assurance process. Once the synchronized job data file is reviewed and/or revised, it may be updated in the central database on the server 324 for access by other users.

Figure 6:
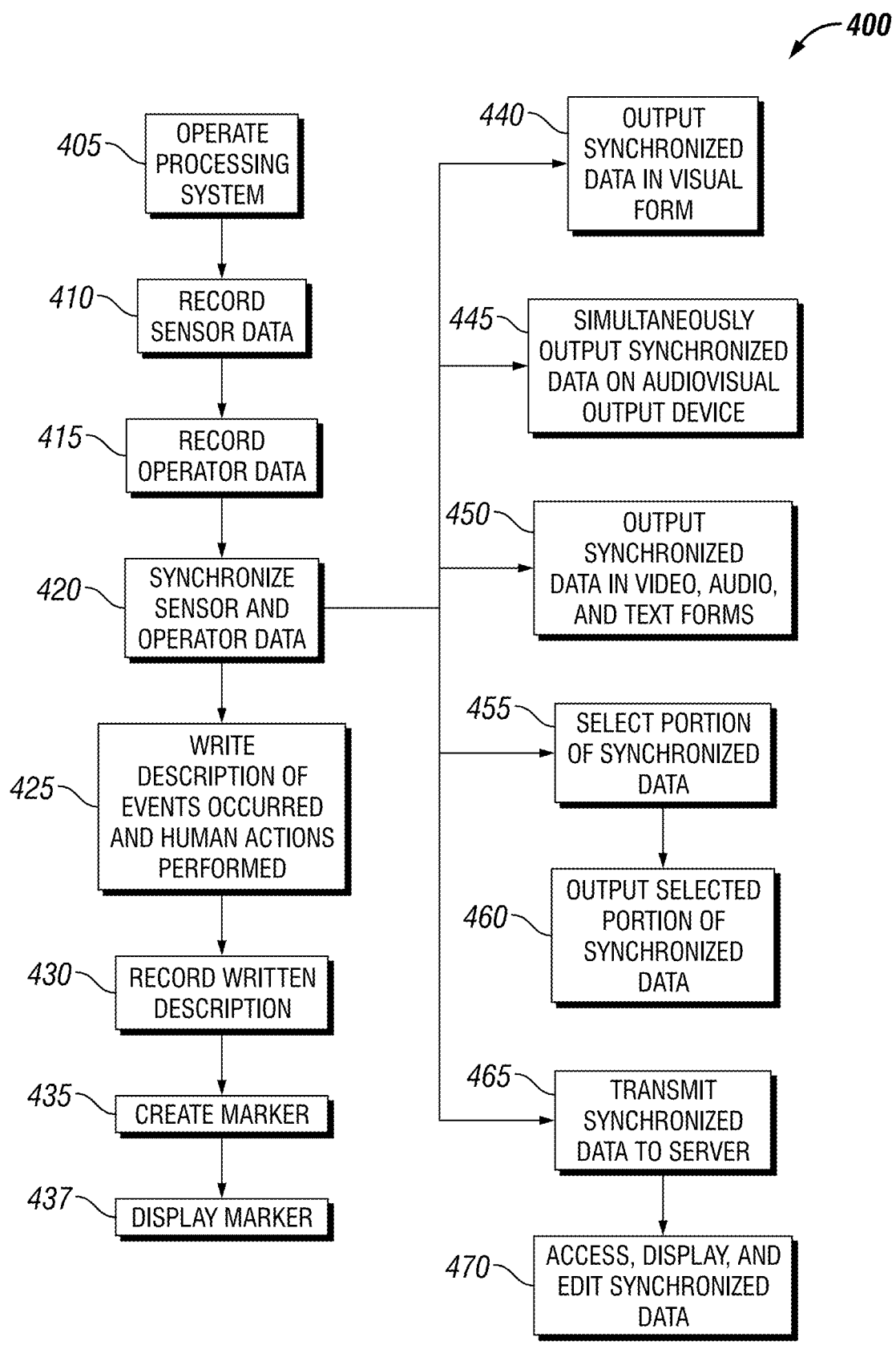
FIG. 6 is a flow-chart diagram of at least a portion of an example implementation of a method according to one or more aspects of the present disclosure.

FIG. 6 is a flow-chart diagram of at least a portion of an example implementation of a method (400) according to one or more aspects of the present disclosure. The method (400) may be performed utilizing at least a portion of one or more implementations of one or more instances of the apparatus shown in one or more of FIGS. 1-5 and/or otherwise within the scope of the present disclosure.

The method (400) comprises operating (405) a processing device (such as the processing device 360), which may cause and/or comprise recording (410) sensor data comprising information generated by sensors at a wellsite (such as the sensors 302 at the wellsites 102, 202) during a wellsite operation. Operating (405) the processing device may also cause and/or comprise recording (415) operator data indicative of human actions performed at the wellsite during the wellsite operation. The wellsite operation, sensor data, operator data, and human actions may be as described above. Operating (405) the processing device may also cause and/or comprise synchronizing (420) the sensor and operator data.

The method (400) may further comprise, after completing at least a portion of the wellsite operation, writing (425) a description of an event that occurred during the wellsite operations and human actions performed in association with the event, and electronically recording (430) the written description in association with the synchronized sensor and operator data associated with the event.

Recording (415) of the operator data may further comprise creating (435) a marker associated with the event of the wellsite operation and displaying (437) the marker on an audiovisual output device in association with the synchronized sensor and operator data associated with the event.

Writing (425) the description and creating (435) the marker may be performed during the wellsite operation and/or after the wellsite operation is completed. The written description may comprise terms that are descriptive of the event, the human action performed during the event, and resolution of issues associated with the event.

Operating (405) the processing device may further cause and/or comprise outputting (440) the synchronized sensor and operator data in a visual form, simultaneously outputting (445) the synchronized sensor and operator data on an audiovisual output device (such as output devices 316, 318), and/or outputting (450) the synchronized sensor and operator data in video, audio, and/or text forms. Operating (405) the processing device may also cause and/or comprise selecting (455) a portion of the synchronized sensor and operator data, such as by a human operator via an audiovisual input/output device, and outputting (460) the selected portion of the synchronized sensor and operator data on the audiovisual input/output device.

The method (400) may further comprise operating (465) the processing device to transmit the synchronized sensor and operator data to a server located remote from the wellsite. The method (400) may also comprise operating (470) another processing device remote from the server to access, display, and/or edit the synchronized sensor and operator data on the server (such as the server 324).

Figure 7:
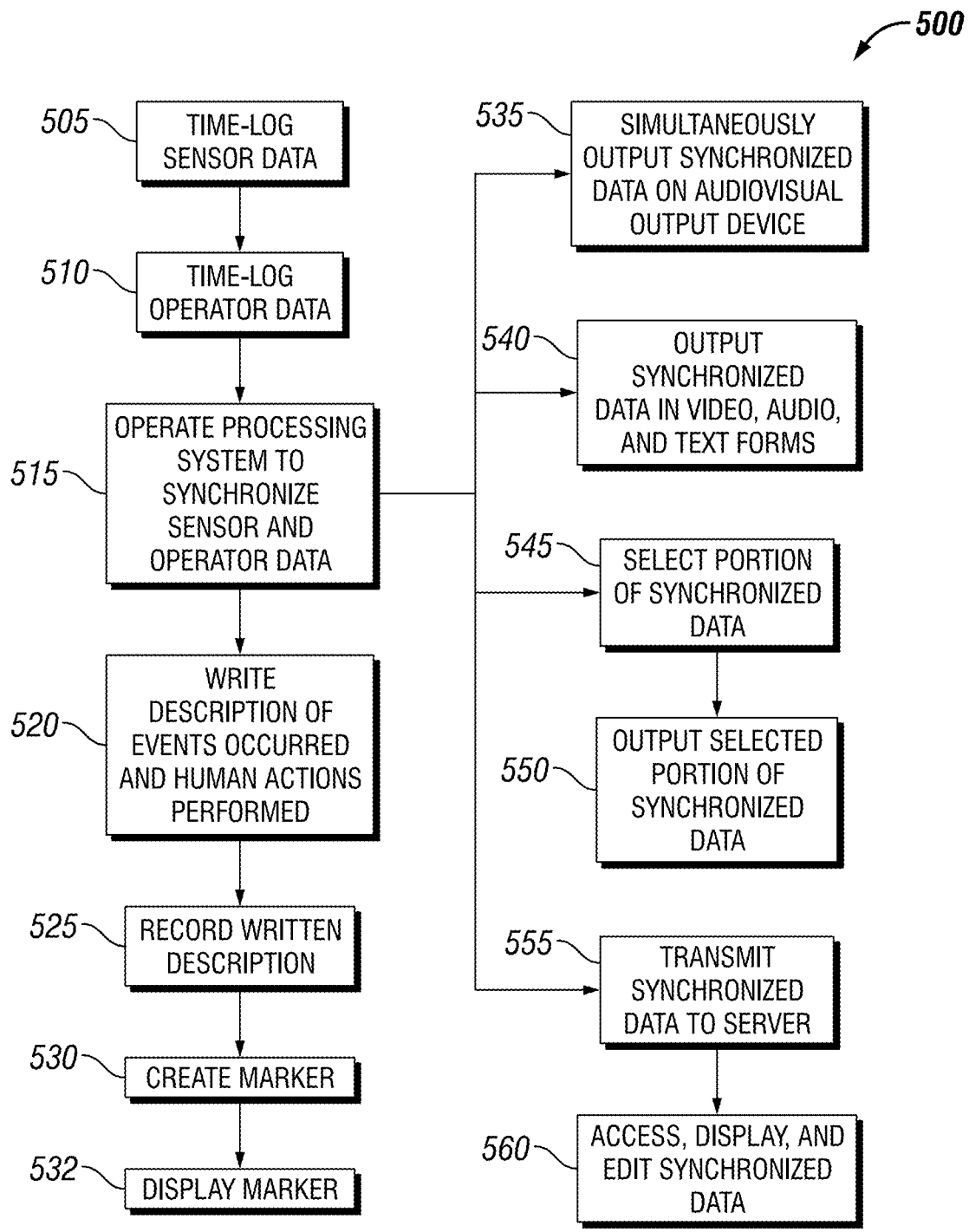
FIG. 7 is a flow-chart diagram of at least a portion of another example implementation of a method according to one or more aspects of the present disclosure.

FIG. 7 is a flow-chart diagram of at least a portion of another example implementation of a method (500) according to one or more aspects of the present disclosure. The method (500) may be performed utilizing at least a portion of one or more implementations of one or more instances of the apparatus shown in one or more of FIGS. 1-5 and/or otherwise within the scope of the present disclosure.

The method (500) may comprise time-logging (505) sensor data generated by sensors at a wellsite (such as sensors 302 at wellsites 102, 202) during a wellsite operation, wherein each sensor is associated with a corresponding one of a plurality of wellsite components utilized during the wellsite operation, and wherein the sensor data is indicative of a corresponding parameter associated with operation of the corresponding wellsite component during the wellsite operation. The method (500) may further comprise time-logging (510) operator data generated by a plurality of input devices (such as input device 304) at the wellsite, wherein the operator data is indicative of human actions performed at the wellsite during the wellsite operation, and operating (515) a processing device (such as the processing device 360) to synchronize the sensor and operator data. The wellsite operation, parameter, operator data, and human actions may be as described above.

Operating (515) the processing device may further cause and/or comprise, after completing at least a portion of the wellsite operation, writing (520) a description of events that occurred and human actions performed during the wellsite operation, and electronically recording (525) the written description. Operating (515) the processing device may further cause and/or comprise associating (530) the written description with a portion of the sensor and operator data related to the completed portion of the wellsite operation.

Time-logging (510) the operator data may further cause and/or comprise, after completing at least a portion of the wellsite operation, writing (520) a description of an event that occurred during the wellsite operation and human actions performed in association with the event, and electronically recording (525) the written description in association with the synchronized sensor and operator data associated with the event. Time-logging (510) the operator data may further comprise creating (530) a marker associated with the event of the wellsite operation, and the method (500) may further comprise operating (532) the processing device to display the marker on an audiovisual output device in association with the synchronized sensor and operator data associated with the event.

Writing (520) the description and creating (530) the marker may be performed during the wellsite operation and/or after the wellsite operation is completed. The written description may comprise terms that are descriptive of the event, the human action performed during the event, and resolution of issues associated with the event.

Operating (515) the processing device may further cause and/or comprise simultaneously outputting (535) the synchronized sensor and operator data on an audiovisual output device (such as the output devices 316, 318). Operating (515) the processing device may further cause and/or comprise outputting (540) the synchronized sensor and operator data in video, audio, and/or text forms.

Operating (515) the processing device may also cause and/or comprise selecting (545) a portion of the synchronized sensor and operator data (such as by a human operator 164, 232 on an audiovisual output device 316, 318). Operating (515) the processing device may also cause and/or comprise and outputting (550) the selected portion of the synchronized sensor and operator data on an audiovisual output device.

The method (500) may further comprise operating (555) the processing device to transmit the synchronized sensor and operator data to a server located remote from the wellsite. The method (500) may also comprise operating (560) another processing device remote from the server to access, display, and/or edit the synchronized sensor and operator data on the server (such as the server 324).

In view of the entirety of the present disclosure, including the claims and the figures, a person having ordinary skill in the art will readily recognize that the present disclosure introduces an apparatus comprising: a wellsite system comprising a plurality of wellsite components; a plurality of input devices each associated with a corresponding one of the wellsite components and operable to generate: sensor data indicative of a parameter associated with a wellsite operation; and operator data indicative of a human action performed in association with the wellsite operation; and a processing device comprising a processor and a memory including computer program code, wherein the processing device is operable to: synchronize the sensor and operator data generated by each of the input devices; and output the synchronized sensor and operator data on an audiovisual output device.

The wellsite operation may comprise at least one of a sampling operation, a completion operation, a cementing operation, a production operation, a stimulation operation, a fracturing operation, and/or a workover operation.

The parameter may be at least one of fluid pressure, fluid force, fluid flow rate, fluid speed, fluid density, fluid level, valve position or setting, downhole tool position or depth, actuator rotational position or speed, fluid temperature, and/or electrical power draw.

The human action may comprise at least one of a voice instruction, a physical action, and/or a command input into at least one of the input devices.

The operator data may comprise at least one of an audio signal, a video signal, and/or an electronic command signal generated by at least one of the input devices. The at least one of the input devices may comprise at least one of a keyboard, a mouse, and/or a touchscreen.

The operator data may comprise a written description of an event that occurred during the wellsite operation and the human action performed in association with the event, and the processing device may be operable to output the written description on the audiovisual output device. In such implementations, among others within the scope of the present disclosure, the operator data may further comprise a marker associated with the event that occurred during the wellsite operation, the processing device may be operable to output the marker on the audiovisual output device in association with the synchronized sensor and operator data associated with the event, and the written description of the event may be associated with the marker. The marker and the associated written description may be entered into the processing device by a human operator during the wellsite operation and/or after the wellsite operation is completed, and the written description may comprise one or more terms that are descriptive of the event, the human action performed during the event, and/or resolution of issues associated with the event.

The processing device may be further operable to output the sensor data in a graph form. The processing device may also or instead be operable to simultaneously output the sensor and operator data generated by at least two of the input devices. The processing device may also or instead be operable to simultaneously output the synchronized sensor and operator data on the audiovisual output device in video, audio, and/or text forms. The processing device may also or instead be operable to: permit the human operator to select a portion of the synchronized sensor and operator data; and output the selected portion of the synchronized sensor and operator data on the audiovisual output device.

The processing device may be a first processing device, and the first processing device may be further operable to transmit the sensor and operator data to a server located remote from the wellsite. In such implementations, among others within the scope of the present disclosure, the apparatus may further comprise a second processing device remote from the server, wherein the second processing device may be operable to access the sensor and operator data saved on the server and permit a user to review and/or edit the saved sensor and operator data.

The present disclosure also introduces a method comprising operating a processing device comprising a processor and a memory including computer program code, wherein operating the processing device causes and/or comprises: recording sensor data comprising information generated by each of a plurality of sensors at a wellsite during a wellsite operation; recording operator data indicative of a human action performed at the wellsite during the wellsite operation; and synchronizing the sensor and operator data.

The wellsite operation may comprise at least one of a sampling operation, a completion operation, a cementing operation, a production operation, a stimulation operation, a fracturing operation, and/or a workover operation.

The sensor data may be indicative of a parameter associated with the wellsite operation. The parameter may be at least one of fluid pressure, fluid force, fluid flow rate, fluid speed, fluid density, fluid level, valve position or setting, downhole tool position or depth, actuator rotational position or speed, fluid temperature, and/or electrical power draw.

The human action may comprise at least one of a voice instruction, a physical action, and/or a command input into an input device in association with the wellsite operation.

The operator data may comprise at least one of an audio signal, a video signal, and/or an electronic command signal generated by an input device. The operator data may include an electronic text file comprising a written description of one or more events that occurred and the human action(s) performed in association with the wellsite operation.

Recording the operator data may further comprise: writing a description of an event that occurred during the wellsite operation and the human action performed in association with the event; and electronically recording the written description in association with the synchronized sensor and operator data associated with the event. In such implementations, among others within the scope of the present disclosure, recording the operator data may further comprise: creating a marker associated with the event of the wellsite operation; and displaying the marker on an audiovisual output device in association with the synchronized sensor and operator data associated with the event. For example, writing the description and creating the marker may be performed during the wellsite operation and/or after the wellsite operation is completed, and the written description may comprise one or more terms that are descriptive of the event, the human action performed during the event, and/or resolution of issues associated with the event.

Operating the processing device may further cause and/or comprise outputting the synchronized sensor and operator data in a visual form. Operating the processing device may also or instead cause and/or comprise simultaneously outputting the synchronized sensor and operator data on an audiovisual output device. Operating the processing device may also or instead cause and/or comprise outputting the synchronized sensor and operator data in video, audio, and/or text forms. Operating the processing device may also or instead cause and/or comprise: receiving a selection by a human operator on an audiovisual output device a portion of the synchronized sensor and operator data; and outputting the selected portion of the synchronized sensor and operator data on the audiovisual output device.

The processing device may be a first processing device, and the method may further comprise: operating the first processing device to transmit the synchronized sensor and operator data to a server located remote from the wellsite; and operating a second processing device remote from the server to access, display, and/or edit the synchronized sensor and operator data on the server.

The present disclosure also introduces a method comprising: time-logging sensor data generated by a plurality of sensors at a wellsite during a wellsite operation, wherein each sensor is associated with a corresponding one of a plurality of wellsite components utilized during the wellsite operation, and wherein the sensor data is indicative of a corresponding parameter associated with operation of the corresponding wellsite component during the wellsite operation; time-logging operator data generated by a plurality of input devices at the wellsite, wherein the operator data is indicative of a human action performed at the wellsite during the wellsite operation; and operating a processing device comprising a processor and a memory including computer program code to synchronize the sensor and operator data.

The wellsite operation may comprise at least one of a sampling operation, a completion operation, a cementing operation, a production operation, a stimulation operation, a fracturing operation, and/or a workover operation.

The parameter may be at least one of fluid pressure, fluid force, fluid flow rate, fluid speed, fluid density, fluid level, valve position or setting, downhole tool position or depth, actuator rotational position or speed, fluid temperature, and/or electrical power draw.

The human action may comprise at least one of a voice instruction, a physical action, and/or a command input into an input device during the wellsite operation.

The operator data may comprise at least one of an audio signal, a video signal, and/or an electronic command signal generated by an input device. The operator data may include an electronic text file comprising a written description of one or more events that occurred and the human action(s) performed during the wellsite operation.

Time-logging the operator data may further comprise, after completing at least a portion of the wellsite operation: writing a description of one or more events that occurred during the wellsite operation and the human action(s) performed in association with the event(s); and electronically recording the written description in association with the synchronized sensor and operator data associated with the event. Time-logging the operator data may further comprise creating a marker associated with the event of the wellsite operation, and the method may further comprise operating the processing device to display the marker on an audiovisual output device in association with the synchronized sensor and operator data associated with the event. Writing the description and creating the marker may be performed during the wellsite operation and/or after the wellsite operation is completed, and the written description may comprise terms that are descriptive of the event(s), the human action (s) performed during the event(s), and/or resolution of issues associated with the event(s).

Operating the processing device may cause and/or comprise simultaneously outputting the synchronized sensor and operator data on an audiovisual output device. Operating the processing device may also or instead cause and/or comprise outputting the synchronized sensor and operator data in video, audio, and/or text forms. Operating the processing device may also or instead cause and/or comprise: selecting by a human operator on an audiovisual output device a portion of the synchronized sensor and operator data; and outputting the selected portion of the synchronized sensor and operator data on the audiovisual output device.

The processing device may be a first processing device, and the method may further comprise: operating the first processing device to transmit the synchronized sensor and operator data to a server located remote from the wellsite; and operating a second processing device remote from the server to access, display, and/or edit the synchronized sensor and operator data on the server.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:
1. A method comprising:
time-logging sensor data generated by a plurality of sensors at a wellsite during a wellsite operation, wherein each sensor is associated with a corresponding one of a plurality of wellsite components utilized during the wellsite operation, and wherein the sensor data is indicative of a corresponding parameter associated with operation of the corresponding wellsite component during the wellsite operation;
time-logging operator data generated by a plurality of input devices at the wellsite, wherein the operator data is indicative of a human action performed at the wellsite during the wellsite operation, wherein the operator data indicative of the human action comprises a voice instruction spoken by one or more wellsite operators and captured as an audio signal by an audio recording device of the plurality of input devices, a physical action performed by the one or more wellsite operators and captured as a photograph or a video by a camera device of the plurality of input devices, and a command input entered by the one or more wellsite operators via an input means of a communication device during the wellsite operation; and
operating a processing device comprising a processor and a memory including computer program code to:
synchronize the sensor and operator data, to receive operator input data associated with the synchronized sensor and operator data via an input device of the plurality of input devices;
create at least one marker relating to the synchronized sensor and operator data based at least in part on the received operator input data;

cause the at least one marker and the synchronized sensor and operator data to be displayed on an audiovisual output device;

output, via a user interface screen of the audiovisual output device, a sensor data graph displaying a plurality of data streams relating to the synchronized sensor data, a video frame displaying a plurality of photographs or videos associated with the synchronized operator data, a command input frame displaying a plurality of input commands for the wellsite operation, a voice instruction frame displaying an audio player interface configured to playback the voice instruction, and a voice text frame displaying identification, source, and/or content relating to the voice instruction; and permit selection and playback of the synchronized sensor and operator data by selection of the at least one marker by a human operator via interaction with a scroll bar associated with the sensor data graph or the audio player interface using an input device of the plurality of input devices.

2. The method of claim 1 wherein the wellsite operation comprises at least one of a sampling operation, a completion operation, a cementing operation, a production operation, a stimulation operation, a fracturing operation, and a workover operation.

3. The method of claim 1 wherein the parameter is fluid pressure, fluid force, fluid flow rate, fluid speed, fluid density, fluid level, valve position or setting, downhole tool position or depth, actuator rotational position or speed, fluid temperature, or electrical power draw.

4. The method of claim 1 wherein the operator data comprises at least one of an audio signal, a video signal, and an electronic command signal generated by an input device.

5. The method of claim 1 wherein the operator data includes an electronic text file comprising a written description of events that occurred and the human action performed during the wellsite operation.

6. The method of claim 1 wherein time-logging the operator data further comprises, after completing at least a portion of the wellsite operation:

writing a description of an event that occurred during the wellsite operation and the human action performed in association with the event, wherein the at least one marker is associated with the description of the event; and electronically recording the written description in association with the synchronized sensor and operator data associated with the event.

7. The method of claim 6 wherein writing the description and creating the at least one marker are performed during the wellsite operation and/or after the wellsite operation is completed, and wherein the written description comprises terms that are descriptive of the event, the human action performed during the event, and/or resolution of issues associated with the event.

8. The method of claim 1 wherein operating the processing device causes and/or comprises:

selecting by the human operator on the audiovisual output device a portion of the synchronized sensor and operator data; and outputting the selected portion of the synchronized sensor and operator data on the audiovisual output device.

9. The method of claim 1 wherein the processing device is a first processing device, and wherein the method further comprises:

operating the first processing device to transmit the synchronized sensor and operator data to a server located remote from the wellsite; and operating a second processing device remote from the server to access, display, and/or edit the synchronized sensor and operator data on the server.

10. An apparatus comprising:

a wellsite system comprising a plurality of wellsite components;

a plurality of input devices each associated with a corresponding one of the wellsite components and operable to generate:

sensor data indicative of a parameter associated with a wellsite operation;

operator data indicative of a human action performed in association with the wellsite operation, wherein the operator data indicative of the human action comprises a voice instruction spoken by one or more wellsite operators and captured as an audio signal by an audio recording device of the plurality of input devices, a physical action performed by the one or more wellsite operators and captured as a photograph or a video by a camera device of the plurality of input devices, and a command input entered by the one or more wellsite operators via an input means of a communication device of the plurality of input devices; and a processing device comprising a processor and a memory including computer program code, wherein the processing device is operable to:

synchronize the sensor operator data generated by each of the input devices;

receive operator input marker data from an input device, the marker data related to the synchronized sensor and operator data;

output the synchronized sensor, operator, and marker data on an audiovisual output device, wherein outputting the synchronized sensor, operator, and marker data on the audiovisual output device comprises outputting, via a user interface screen of the audiovisual output device, a sensor data graph displaying a plurality of data streams relating to the synchronized sensor data, a video frame displaying a plurality of photographs or videos associated with the synchronized operator data, a command input frame displaying a plurality of input commands for the wellsite operation, a voice instruction frame displaying an audio player interface configured to playback the voice instruction, and a voice text frame displaying identification, source, and/or content relating to the voice instruction; and permit selection and playback of the synchronized sensor, operator, and marker data by selection of the marker data by a human operator via interaction with a scroll bar associated with the sensor data graph or the audio player interface using at least one of the input devices.

11. The apparatus of claim 10 wherein:
the operator data comprises at least one of an audio signal, a video signal, and an electronic command signal generated by the at least one of the input devices; and
the at least one of the input devices comprises at least one of a keyboard, a mouse, and a touchscreen.

12. The apparatus of claim 10 wherein the processing device is further operable to:
output the sensor data in a graph form;

simultaneously output the sensor and operator data generated by at least two of the input devices; and simultaneously output the synchronized sensor and operator data on the audiovisual output device in video, audio, and text forms.

13. The apparatus of claim 10 wherein the processing device is further operable to:

permit the human operator to select a portion of the synchronized sensor and operator data; and output the selected portion of the synchronized sensor and operator data on the audiovisual output device.

14. The apparatus of claim 10 wherein:

the processing device is a first processing device;

the first processing device is further operable to transmit the sensor and operator data to a server located remote from the wellsite;

the apparatus further comprises a second processing device remote from the server; and the second processing device is operable to access the sensor and operator data saved on the server and permit a user to review and/or edit the saved sensor and operator data.

15. A method comprising:

operating a processing device comprising a processor and a memory including computer program code, wherein operating the processing device causes and/or comprises:

recording sensor data comprising information generated by each of a plurality of sensors at a wellsite during a wellsite operation;

recording operator data indicative of a human action performed at the wellsite during the wellsite operation by a plurality of input devices, wherein the operator data indicative of the human action comprises a voice instruction spoken by one or more wellsite operators and captured as an audio signal by an audio recording device of the plurality of input devices, a physical action performed by the one or more wellsite operators and captured as a photograph or a video by a camera device of the plurality of input devices, and a command input entered by the one or more wellsite operators via an input means of a communication device of the plurality of input devices;

synchronizing the sensor and operator data;

receiving input data from an operator to create at least one marker relating to the synchronized sensor and operator data;

displaying the at least one marker and the synchronized sensor and operator data on an audiovisual output device, wherein displaying the at least one marker and the synchronized sensor and operator data on the audiovisual output device comprises outputting, via a user interface screen of the audiovisual output device, a sensor data graph displaying a plurality of data streams relating to the synchronized sensor data, a video frame displaying a plurality of photographs or videos associated with the synchronized operator data, a command input frame displaying a plurality of input commands for the wellsite operation, a voice instruction frame displaying an audio player interface configured to playback the voice instruction, and a voice text frame displaying identification, source, and/or content relating to the voice instruction; and permitting selection and playback of the synchronized sensor and operator data by selection of the at least one marker by a human operator via interaction with a scroll bar associated with the sensor data graph or the audio player interface using an input device.

16. The method of claim 15 wherein recording the operator data further comprises:

receiving a written description of an event that occurred during the wellsite operation and the human action performed in association with the event, wherein the at least one marker is associated with the written description of the event; and electronically recording the written description in association with the synchronized sensor and operator data associated with the event.

17. The method of claim 15 wherein the processing device is a first processing device, and wherein the method further comprises:

operating the first processing device to transmit the synchronized sensor and operator data to a server located remote from the wellsite; and operating a second processing device remote from the server to access, display, and/or edit the synchronized sensor and operator data on the server.

\* \* \* \* \*